US007295822B2

(12) United States Patent
Sano

(10) Patent No.: US 7,295,822 B2
(45) Date of Patent: Nov. 13, 2007

(54) RADIO WAVE RECEIVER, RADIO-CONTROLLED TIMEPIECE AND TUNING CAPACITANCE SETTING METHOD

(75) Inventor: Takashi Sano, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 245 days.

(21) Appl. No.: 10/529,790

(22) PCT Filed: Mar. 12, 2004

(86) PCT No.: PCT/JP2004/003380

§ 371 (c)(1),
(2), (4) Date: Mar. 30, 2005

(87) PCT Pub. No.: WO2004/083967

PCT Pub. Date: Sep. 30, 2004

(65) Prior Publication Data

US 2006/0176776 A1 Aug. 10, 2006

(30) Foreign Application Priority Data

Mar. 17, 2003 (JP) ............................ 2003-071366

(51) Int. Cl.
*H04B 1/18* (2006.01)

(52) U.S. Cl. .............................. 455/181.1; 455/182.1; 455/182.2; 455/182.3; 455/185.1; 455/186.1; 455/231; 455/344; 455/192.2; 455/193.1; 455/195.1

(58) Field of Classification Search .. 455/193.1–193.3, 455/195.1, 197.2, 161.1, 160.1, 181.1, 182.1, 455/182.2, 182.3, 231, 344, 192.2, 185.1, 455/186.1
See application file for complete search history.

(56) References Cited

U.S. PATENT DOCUMENTS

| | | | | |
|---|---|---|---|---|
| 4,011,514 | A * | 3/1977 | Wroblewski | 455/169.2 |
| 4,186,360 | A * | 1/1980 | Ohashi | 334/55 |
| 4,287,597 | A | 9/1981 | Paynter et al. | |
| 4,315,332 | A * | 2/1982 | Sakami et al. | 455/181.1 |
| 4,862,516 | A | 8/1989 | Macnak et al. | |
| 5,117,206 | A * | 5/1992 | Imamura | 331/158 |
| 5,136,719 | A * | 8/1992 | Gaskill et al. | 455/193.1 |
| 5,537,101 | A | 7/1996 | Nakajima et al. | |
| 5,670,881 | A * | 9/1997 | Arakawa et al. | 324/322 |
| 5,745,884 | A | 4/1998 | Carnegie et al. | |
| 6,172,576 | B1 * | 1/2001 | Endo et al. | 331/116 R |
| 6,181,218 | B1 * | 1/2001 | Clark et al. | 331/177 R |
| 6,239,675 | B1 * | 5/2001 | Flaxl | 334/55 |

(Continued)

FOREIGN PATENT DOCUMENTS

EP 0 372 430 A2 6/1990

(Continued)

*Primary Examiner*—Edan Orgad
*Assistant Examiner*—RuiMeng Hu
(74) *Attorney, Agent, or Firm*—Frishauf, Holtz, Goodman & Chick, P.C.

(57) ABSTRACT

A radio wave receiver for receiving radio waves having a predetermined frequency, the receiver comprises an antenna, an variable capacitor connected to the antenna, a memory, and a controller which determines an optimum capacitance of the variable capacitor with which the radio wave receiver is in a predetermined reception state and writes optimum capacitance data into the memory and, controls the variable capacitor based on the optimum capacitance data.

11 Claims, 8 Drawing Sheets

U.S. PATENT DOCUMENTS

| | | | | |
|---|---|---|---|---|
| 6,424,824 | B1 | 7/2002 | Stepp et al. | |
| 6,525,995 | B1 | 2/2003 | Diehl et al. | |
| 6,686,804 | B1 * | 2/2004 | Adams et al. | 331/17 |
| 6,993,314 | B2 * | 1/2006 | Lim et al. | 455/333 |
| 2001/0036811 | A1 * | 11/2001 | Kianush et al. | 455/41 |
| 2003/0119469 | A1 | 6/2003 | Karr et al. | |
| 2004/0214543 | A1 * | 10/2004 | Osone et al. | 455/197.2 |

FOREIGN PATENT DOCUMENTS

| | | | |
|---|---|---|---|
| EP | 0 431 887 | A2 | 6/1991 |
| JP | 63-073711 | A | 4/1988 |
| JP | 04-150421 | A | 5/1992 |
| JP | 6-125280 | A | 5/1994 |
| JP | 10-084304 | A | 3/1998 |
| JP | 2000-115006 | A | 4/2000 |
| JP | 2001-267950 | A | 9/2001 |
| JP | 2002-82187 | A | 3/2002 |
| JP | 2002-267775 | A | 9/2002 |
| JP | 2003-060520 | A | 2/2003 |

* cited by examiner

2071

| FREQUENCY | SET VALUE |
|---|---|
| 1ST FREQUENCY | 14H |
| 2ND FREQUENCY | 30H |
| 3RD FREQUENCY | 58H |

FIG.5

RADIO WAVE RECEIVER, RADIO-CONTROLLED TIMEPIECE AND TUNING CAPACITANCE SETTING METHOD

This application is a U.S. National Phase Application under 35 USC 371 of International Application PCT/JP2004/003380 filed Mar. 12, 2004.

TECHNICAL FIELD

The present invention relates to a radio wave receiver, a radio-controlled timepiece and a tuning capacitance setting method.

BACKGROUND ART

At the present day, there is known a so-called radio-controlled timepiece which receives long-wave standard time radio waves with time data, i.e., a time code transmitted in respective countries (e.g., Germany, United Kingdom, Japan and others) and corrects time data of a clocking circuit based on the received radio waves.

Meanwhile, when radio waves are received by using, e.g., a bar antenna, there is used a tuning circuit which receives radio waves by causing an inductance of the antenna, a capacitor and the like to be resonant with radio waves having a desired frequency. In such a tuning circuit, tuning with radio waves having a desired frequency is effected by changing a capacity to be connected to the antenna.

It is general that a conventional radio-controlled timepiece comprises a radio wave receiving circuit including such a tuning circuit. As one of such circuits, there is known a radio wave receiving circuit which performs tuning with long-wave standard time radio waves by using a method to attach a plurality of chip capacitors.

That is, at the time of industrial assembly, an inductance of an antenna is measured, and chip capacitors whose capacitances are not more than a desired capacitance are first attached by soldering. Then, a resonance frequency is measured, an insufficient capacitance is calculated, and a chip capacitor whose capacitance is slightly smaller than the insufficient capacitance is further attached by soldering. Furthermore, operations to measure the resonance frequency and adjust the tuning capacitance are repeatedly carried out according to needs, and adjustment is effected in such a manner that the radio wave receiving circuit performs optimum tuning with respect to the long-wave standard time radio waves.

Moreover, Japanese Patent Application KOKAI Publication No. 6-125280 discloses a radio wave receiving circuit which comprises two capacitors included in a tuning circuit in parallel and can select a resonance frequency by switching a connection of one of the capacitors based on ON/OFF of a switch and changing a tuning capacitance. However, this is used to switch a resonance frequency to be selected, but it is not intended to change a capacitance in order to tune with radio waves having a desired frequency.

The method for attaching the plurality of chip capacitors requires adjustment of a tuning capacitance when assembling a product, but operations to measure a resonance frequency and attach capacitors must be repeatedly carried out in that adjustment. Therefore, the number of working steps, a working time, a cost and others are taken. Additionally, capacitors, a switch element which switches the capacitors and others are required in accordance with the number of frequencies of radio waves to be received. Therefore, when receiving a plurality of radio waves, applying the technique disclosed in Japanese Patent Application KOKAI Publication No. 6-125280 increases the number of components or a substrate area, and hence a reduction in size of the circuit is difficult.

Further, if tuning adjustment is performed only in a circuit substrate for tuning having an antenna and capacitors mounted thereon and then the adjusted circuit substrate is set in a radio-controlled timepiece and connected with a timepiece circuit substrate, a resonance frequency deviates due to an IC other than the tuning circuit substrate, an input capacitance of the timepiece circuit substrate or the like. Therefore, when trying to perform complete adjustment of the tuning capacitance, tuning adjustment must be again performed in the entire radio-controlled timepiece.

DISCLOSURE OF INVENTION

According to an embodiment of the present invention, there is provided a radio wave receiver which can be automatically set in a tuning state optimum relative to radio waves having a predetermined frequency, a radio-controlled timepiece and a tuning capacitance setting method.

According to another embodiment of the present invention, there is provided a radio wave receiver for receiving radio waves having a predetermined frequency, the receiver comprises an antenna, an variable capacitor connected to the antenna, a memory, and a controller which determines an optimum capacitance of the variable capacitor with which the radio wave receiver is in a predetermined reception state and writes optimum capacitance data into the memory and, controls the variable capacitor based on the optimum capacitance data.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 is a view showing a data configuration of a set value data table depicted in FIG. 3;

BEST MODE OF CARRYING OUT THE INVENTION

An embodiment according to the present invention will now be described hereinafter with an illustrated example. Although a description will be given as to an example in which a radio wave receiver according to the present invention is applied to a radio-controlled timepiece in each embodiment, the example to which the present invention can be applied is not restricted thereto as long as it is an apparatus used to receive radio waves.

Figure 1:
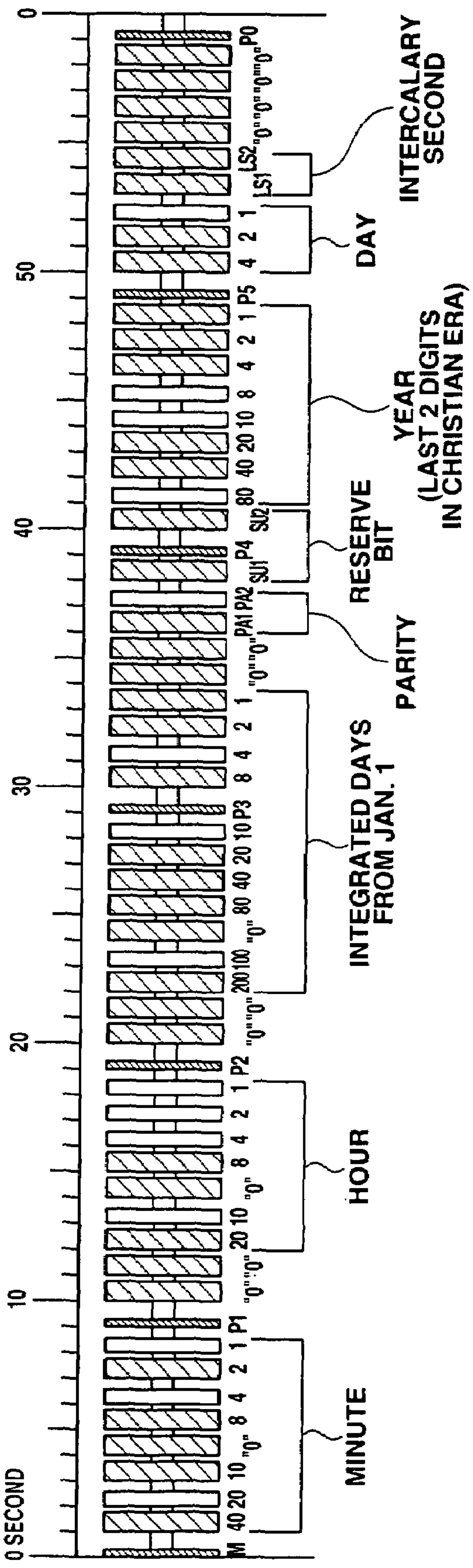
FIG. 1 is a view showing a waveform of long-wave standard time radio waves.

In Japan, long-wave standard time radio waves of 40 kHz and 60 kHz subjected to amplitude modulation with a time code having such a format as shown in FIG. 1 are transmitted from two transmitting stations (Fukushima prefecture and Saga prefecture). According to FIG. 1, the time code is transmitted in a frame of one cycle composed of 60 seconds every time a digit of a minute of a correct time is updated, i.e., every one minute.

Figure 2:
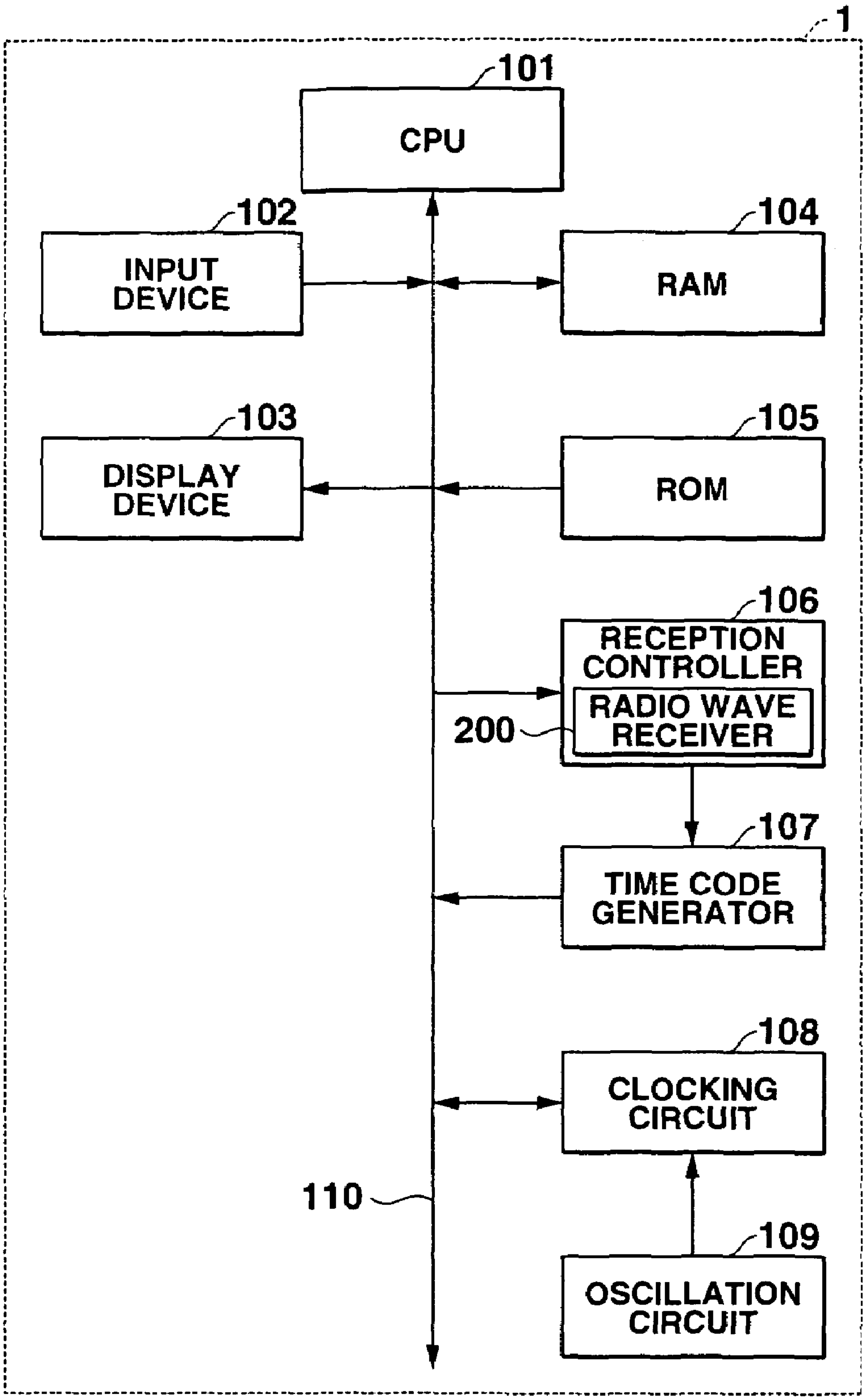
FIG. 2 is a block diagram showing an internal structure of a radio-controlled timepiece according to an embodiment of the present invention.

FIG. 2 is a circuit configuration diagram of a radio-controlled timepiece 1. The timepiece 1 comprises a CPU (Central Processing Unit) 101, an input device 102, a display device 103, an RAM (Random Access Memory) 104, an ROM (Read Only Memory) 105, a reception controller 106, a time code generator 107, a clocking circuit 108 and an oscillation circuit 109. The respective portions except the oscillation circuit 109 are connected with each other through a bus 110. The oscillation circuit 109 is connected to the clocking circuit 108.

The CPU 101 reads various kinds of programs stored in the ROM 105 and develops them in the RAM 104 in accordance with a predetermined timing or an operation signal or the like input from the input device 102, and performs instruction or data transfer to each function portion based on the programs.

The CPU 101 executes receiving processing of long-wave standard time radio waves by controlling the reception controller 106 every, e.g., predetermined time, corrects current time data counted in the clocking circuit 108 based on a standard time code input from the time code generator 107, outputs a display signal based on the corrected current time data to the display device 103, and performs various controls such as updating of a displayed time. Moreover, the CPU 101 outputs a signal indicative of one of two operating modes, i.e., a tuning mode and a receiving mode to the radio wave receiver 200.

The input device 102 comprises switches or the like which cause the radio-controlled timepiece 1 to execute various functions. Additionally, when these switches are operated, operation signals of corresponding switches are output to the CPU 101.

The display device 103 comprises a small liquid crystal display or the like, and digitally displays data from the CPU 101, e.g., current time data or the like obtained by the clocking circuit 108.

The RAM 104 is used to store data processed by the CPU 101 and output stored data to the CPU 101 under control of the CPU 101. The ROM 105 mainly stores a system program concerning the radio-controlled timepiece 1 and an application program.

The reception controller 106 comprises the radio wave receiver 200. The radio wave receiver 200 takes out a corresponding frequency signal by cutting an unnecessary frequency component of the long-wave standard time radio waves, converts the frequency signal into a corresponding electrical signal, and outputs it.

The time code generator 107 generates a standard time code including data required for a clock function such as a standard time code, an integration code, a day code and the like based on the signal output from the radio wave receiver 200, and outputs it to the CPU 101.

The clocking circuit 108 counts signals input from the oscillation circuit 109, and obtains the current time data and the like. Then, it outputs the current time data to the CPU 101. The oscillation circuit 109 is a circuit which constantly outputs signals with a fixed frequency.

Figure 3:
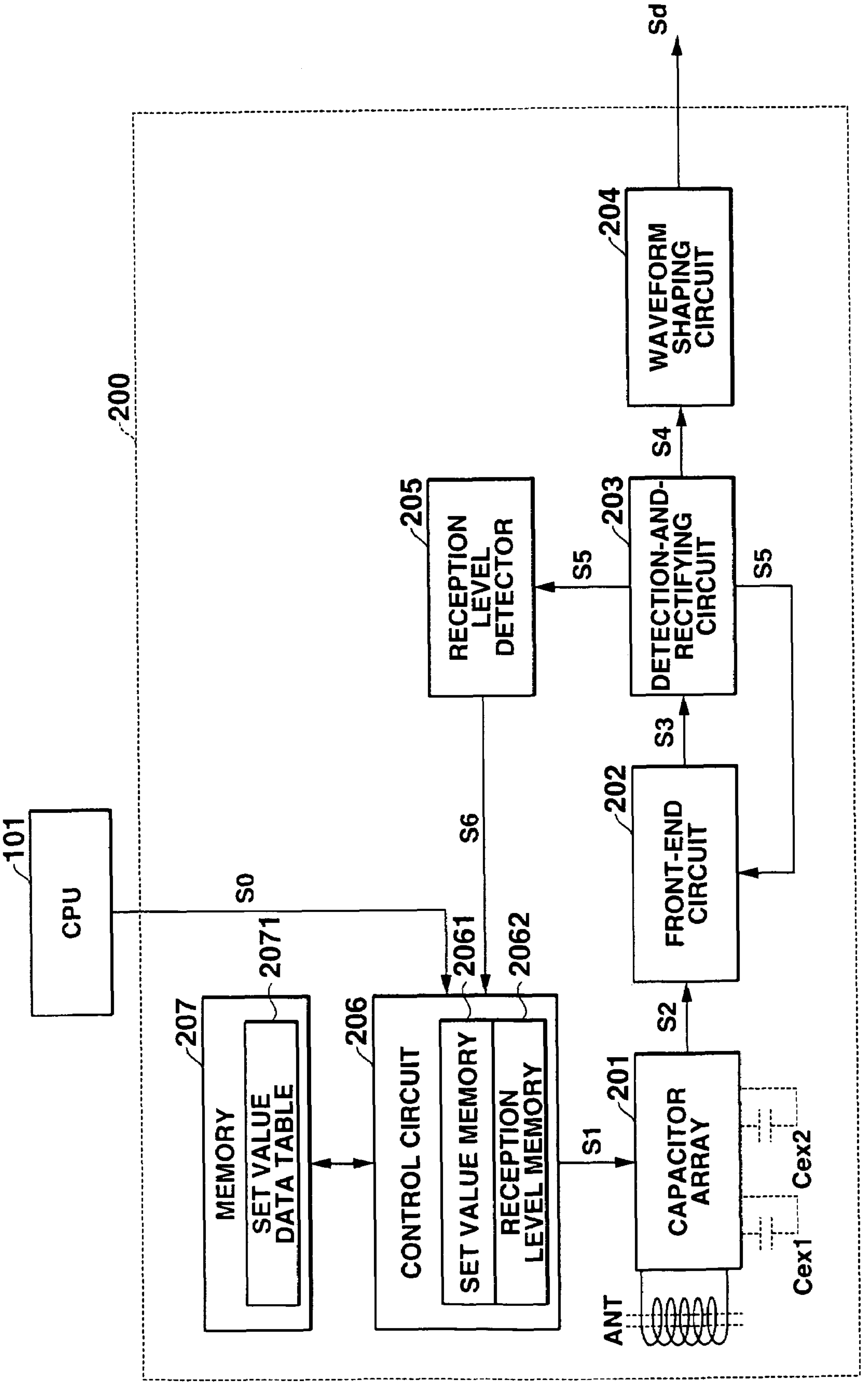
FIG. 3 is a circuit block diagram of a radio wave receiver depicted in FIG. 2.

FIG. 3 is a circuit block diagram of the radio wave receiver 200 in this embodiment. The radio wave receiver 200 comprises, e.g., an antenna ANT, a capacitor array 201, a front-end circuit 202, a detection-and-rectifying circuit 203, a waveform shaping circuit 204, a reception level detection circuit 205, a control circuit 206, and a memory 207.

The antenna ANT can receive the long-wave standard time radio waves, and it is constituted of, e.g., a bar antenna. The receive radio waves are input to the capacitor array 201.

Figure 4:
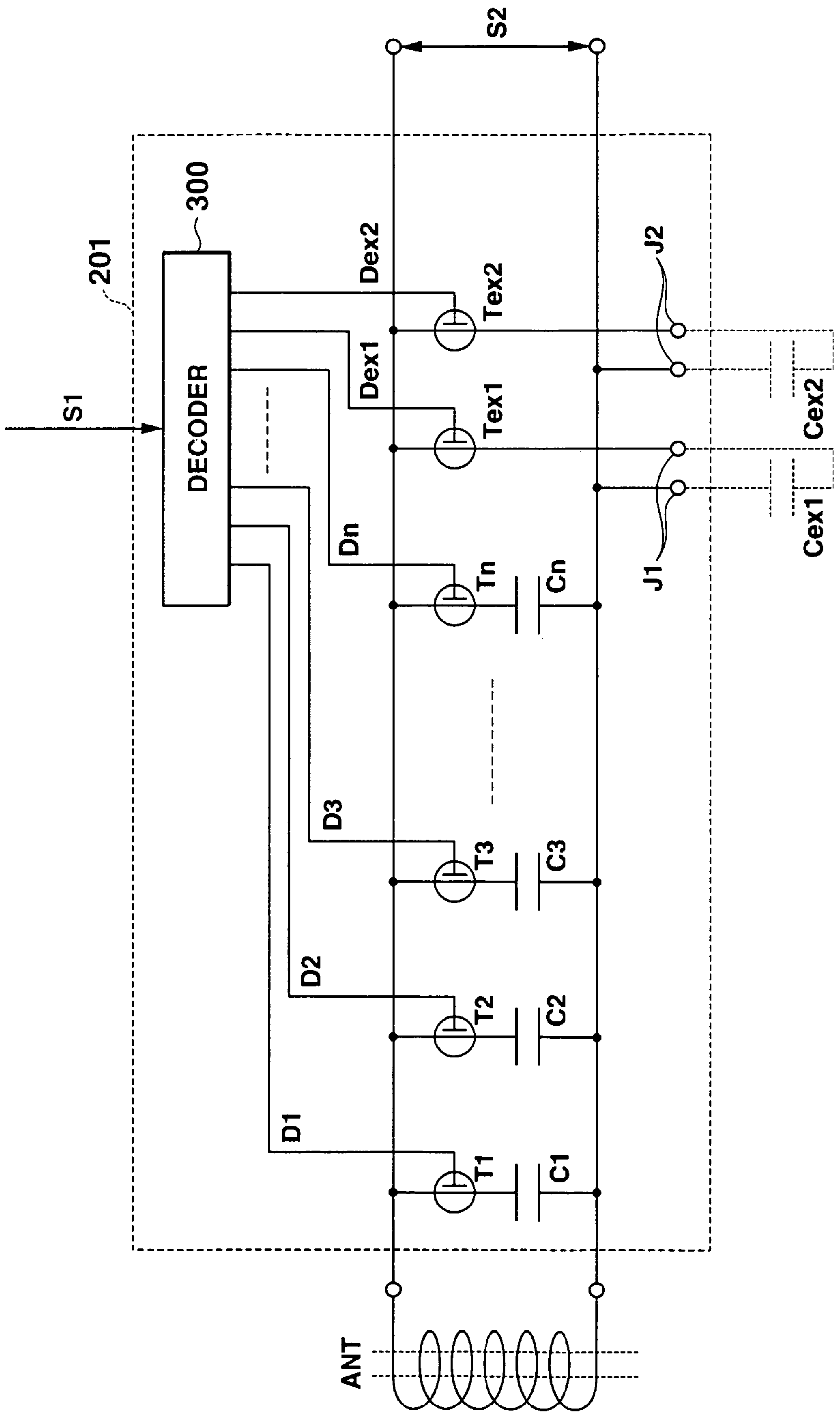
FIG. 4 is a circuit configuration diagram of a capacitor array depicted in FIG. 3.

FIG. 4 shows a circuit configuration of the capacitor array 201. The capacitor array 201 includes capacitors C1 to Cn (n is an integer not less than 2) and transistors T1 to Tn provided inside an IC (integrated circuit). Each of the capacitors C1 to Cn and each of the transistors T1 to Tn are connected in series. The series connections of the capacitor C1 (C2 to Cn) and the transistor T1 (T2 to Tn) are connected with each other in parallel.

Furthermore, the capacitor array 201 includes connection terminals J1 and J2 so that external capacitors Cex1 and Cex2 attached to the outside of the IC can be connected. The external capacitors Cex1 and Cex2 are respectively connected with transistors Tex1 and Tex2 in series, and further connected to the capacitors C1 to Cn in parallel. The external capacitors Cex1 and Cex2 are capacitors which have relatively large capacitances as compared with, e.g., those of the capacitors C1 to Cn, and they are added according to circumstances.

The capacitors C1 to Cn are combined with each other by the switching operations of the corresponding transistors T1 and Tn, and a capacitance of the entire capacitor array 201 is controlled. In the later-described tuning mode, since the transistors T1 to Tn are sequentially switched so as to increase a capacitance of the entire capacitor array 201, the capacitors C1 to Cn are arranged in a predetermined order, e.g., an ascending order of capacitances.

A capacitance selection signal S1 output from the control circuit 206 is input to a decoder 300. The decoder 300 decodes the capacitance selection signal S1, and outputs switching data used to control ON/OFF of each transistor. Switching data D1 to Dn, Dex1 and Dex2 output from the decoder 300 are respectively input to gates of the transistors T1 to Tn, Tex1 and Tex2.

For example, when the switching data D1 is "1", the transistor T1 is turned on, and the capacitor C1 is connected to the antenna ANT in parallel. When the switching data D1 is "0", the transistor T1 is turned off, and the capacitor C1 is electrically disconnected from the antenna ANT. The same operation is carried out with respect to the other transistors.

The decoder 300 is not restricted to the above-described structure as long as it is a circuit (e.g., a multiplexer or a ring counter) which outputs a signal which can control ON/OFF of each transistor in accordance with the capacitance selection signal S1.

A tuning frequency is controlled based on an inductance of the antenna ANT and a capacitance of the capacitor connected to the antenna ANT in parallel, and radio waves received by the antenna ANT are converted into an electrical signal and output as a signal S2.

The signal S2 and a signal S5 are input to the front-end circuit 202. The front-end circuit 202 applies predetermined signal processing to the signal S2, and outputs the processed signal as a signal S3.

When the radio wave receiver 200 is formed as a straight type, the front-end circuit 202 includes an amplification circuit which amplifies the signal S2, a filter or the like. When the radio wave receiver 200 is constituted as a super heterodyne type, the front-end circuit 202 includes, e.g., an oscillation circuit which generates a signal having a local oscillatory frequency, and a frequency conversion circuit which generates an intermediate frequency signal by combining a signal generated by the oscillatory circuit with the signal S2.

The front-end circuit 202 performs adjustment (AGC or the like) of an amplification of the amplification circuit included in the circuit based on the signal S5 which is an AGC feedback voltage in such a manner that a signal level of the signal S3 to be output is changed to an optimum level.

The signal S3 is input to the detection-and-rectifying circuit 203, and this circuit 203 detects a base band signal from the signal S3. The detection-and-rectifying circuit 203 outputs the detected base band signal as a signal S4. The detection-and-rectifying circuit 203 outputs the signal S5 to the front-end circuit 202 and the reception level detection circuit 205 in accordance with a signal level of the signal S3.

The signal S4 is input to the waveform shaping circuit 204, and this circuit 204 performs waveform shaping of the signal S4 so as to obtain a signal optimum for the time code generator 107 and outputs a result as a signal Sd. The signal S5 is input to the reception level detection circuit 205, and this circuit 205 performs processing by, e.g., amplifying the signal S5 and outputs a result as a reception level signal S6.

The reception level signal S6 and a signal S0 from the CPU 101 are input to the control circuit 206. The signal S0 is a signal indicative of one of the tuning mode and the receiving mode. When the signal S0 is indicative of the tuning mode, the control circuit 206 outputs the capacitance selection signal S1 used to control ON/OFF of the transistors T1 to Tn, Tex1 and Tex2 in the capacitor array 201. Combinations of ON/OFF of the transistors T1 to Tn, Tex1 and Tex2 when indicating optimum tuning with the received radio waves are stored in the memory 207 based on the reception level signal S6.

When the signal S0 is indicative of the receiving mode, the control circuit 206 reads a set value is corresponding to a frequency of the received radio waves from the memory 207, and outputs the set value as the capacitance selection signal S1 to the capacitor array 201. A detailed flow of operations in the tuning mode and the receiving mode will be described later with reference to a flowchart.

The control circuit 206 includes a set value memory 2061 and a reception level memory 2062. Each memory is constituted of a temporary memory such as a RAM.

The set value output from the control circuit 206 is stored in the memory 207. The memory 207 is constituted of a nonvolatile memory such as an EEPROM (Electrically Erasable Programmable Read-Only Memory) which can read/write data, and stores a set value data table 2071 or the like therein.

FIG. 5 is a view showing an example of the set value data table 2071. In the set value data table 2071 are stored frequencies of the received radio waves and set values of the capacitance selection signal S1 in association with each other.

Giving a concrete description, in regard to the switching data D1 to Dn, Dex1 and Dex2 output from the decoder 300, assuming that n=6, there can be obtained eight sets of switching data D1 to D6, Dex1 and Dex2, and the eight sets of data are used to control ON/OFF of the eight transistors T1 to T6, Tex1 and Tex2.

For example, in the receiving mode, when the set value of the capacitance selection signal S1 output from the control circuit 206 is "14H", this value is decoded as "00010100" by the decoder 300. The switching data has values corresponding to respective bits in the decoded value. For example, the switching data D1 to D3, D5, Dex1 and Dex2 are "0", and the switching data D4 and D6 are "1". They are input to the gates of the respective transistors T1 to T6, Tex1 and Tex2. Then, since the transistors T4 and T6 are turned on, the capacitors C4 and C6 are connected to the antenna ANT in parallel.

For example, in the receiving mode, when trying tuning to the radio waves having a second frequency, the control circuit 206 reads a set value "30H" corresponding to the second frequency from the set value data table 2071. Then, it outputs the set value as the capacitance selection signal S1 to the decoder 300 of the capacitor array 201.

In this case, the value of the capacitance signal S1 is decoded as "00110000" by the decoder 300. For example, the switching data D1, D2, D5, D6, Dex1 and Dex2 are input as "0" and the switching data D3 and D4 are input as "1" to the gates of the respective transistors. Then, the transistors T3 and T4 are turned on, and the capacitors C3 and C4 are connected to the antenna ANT in parallel.

Each set value is set in the tuning mode, and stored in the set value data table 2071. The set values differ from each other depending on each radio-controlled timepiece based on characteristics of the radio wave receiver 200 or affections of any other circuits.

Figure 6:
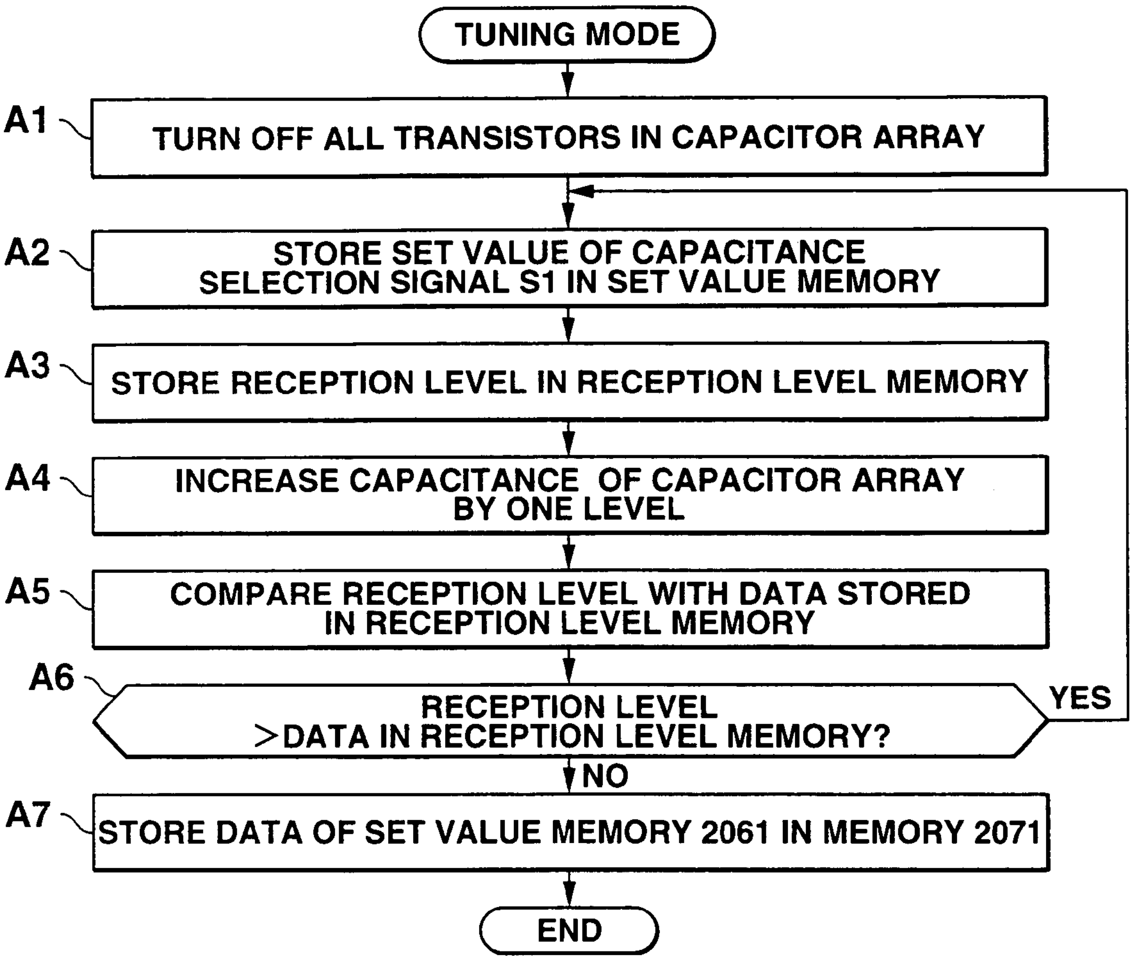
FIG. 6 is a flowchart showing an operation of a control circuit in a tuning mode according to the embodiment of the present invention.

A description will now be given as to a method for setting a tuning capacitance with respect to a predetermined frequency of the capacitor array 201. FIG. 6 is a flowchart illustrating a flow of the operation of the control circuit 206 in the tuning mode. When the signal S0 indicative of the tuning mode is input to the control circuit 206 from the CPU 101, the operation in the tuning mode starts.

The tuning mode is carried out, e.g., before factory shipment after the radio wave receiver 200 is assembled as an internal circuit of the radio-controlled timepiece instead of an elemental unit formed of only the radio wave receiver 200.

The control circuit 206 outputs a capacitance selection signal S1 instructing to turn off all the transistors T1 to Tn, Tex1 and Tex2 included in the capacitor array 201 (step A1). The control circuit 206 stores a set value of the capacitance selection signal S1 output at step A1 in the set value memory 2061 (step A2).

The control circuit 206 stores a value of the reception level signal S6 in the reception level memory 2062 (step A3), changes the set value of the capacitance selection signal S1 so as to increase the tuning capacitance of the capacitor array 201 by one level, and outputs a result (step A4).

The control circuit 206 compares the value of the reception level signal S6 with the value stored in the reception level memory 2062 (step A5). When the value indicated by the reception level signal S6 is larger than the stored value (step A6; Yes), the operation is repeated from step A2.

When the value indicated by the reception level signal S6 is smaller than the stored value (step A6; No), the control circuit 206 stores in the set value data table 2071 the data stored in the set value memory 2061 (step A7). At this step, the set value is stored in association with the frequency of the received radio waves. Then, the tuning mode is terminated.

Figure 8:
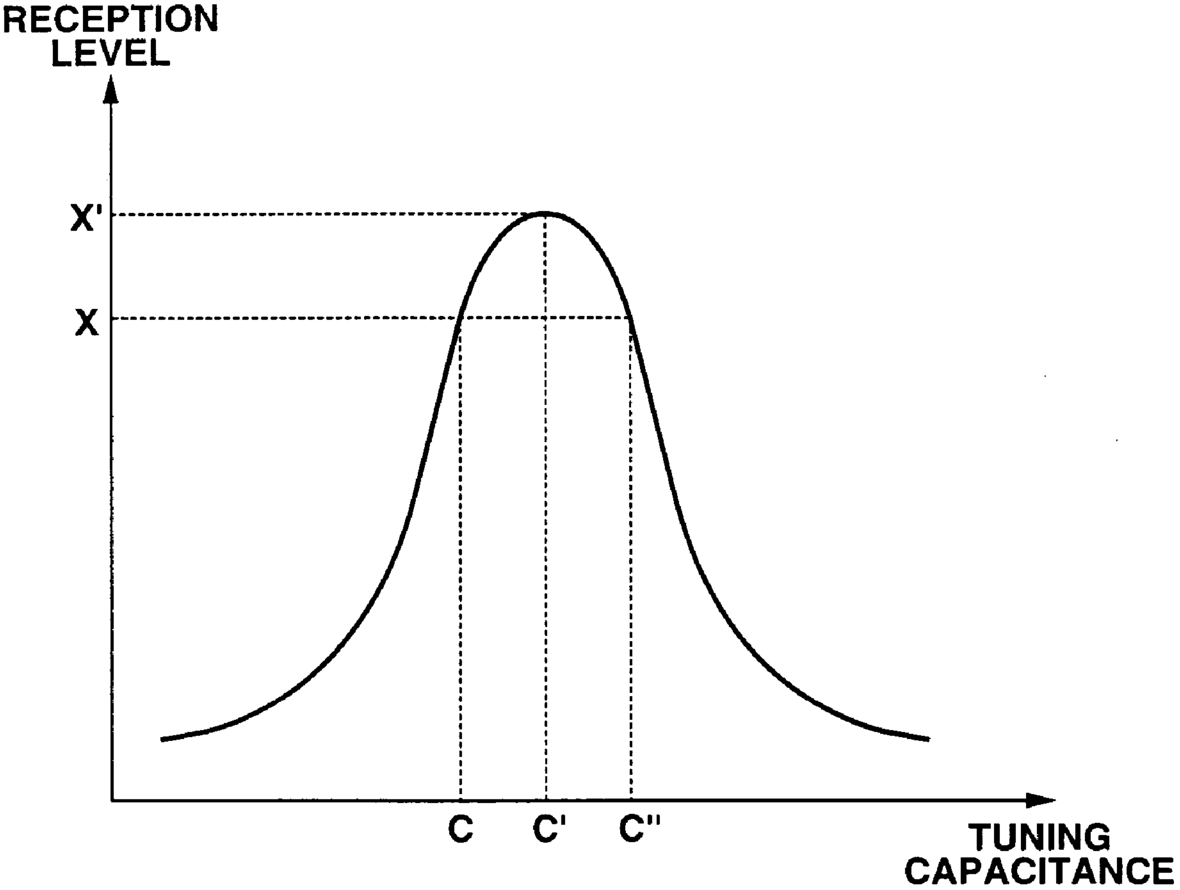
FIG. 8 is a relationship view of a reception level of a radio wave signal and a tuning capacitance according to the embodiment of the present invention.

A comparison judgment of the reception level at step A6 will now be described in details. FIG. 8 is a view showing a relationship between the tuning capacitance of the capacitor array 201 and the reception level indicated by the reception level signal S6.

For example, a reception level X for a tuning capacitance C of the capacitor array 201 is stored in the reception level memory 2062. The control circuit 206 outputs the capacitance selection signal S1 so as to increase the tuning capacitance of the capacitor array 201 by one level (corresponding to step A4) and the tuning capacitance is changed to C'. The reception level signal S6 at this moment indicates a reception level X'. Since the reception level X<the reception level X' is achieved, the set value of the capacitance selection signal S1 is stored in the set value memory 2061 (corresponding to step A2). The reception level X' is stored in the reception level memory 2062 (corresponding to step A3).

Subsequently, the control circuit 206 again outputs the capacitance selection signal S1 so as to increase the tuning capacitance of the capacitor array 201 by one level (corresponding to step A4) and the tuning capacitance is changed to C". The reception level signal S6 at this moment is indicative of the reception level X, the reception level X<the reception level X' is achieved. That is, the set value of the previously output capacitance selection signal S1 derived the reception level higher than that of the set value of the currently output capacitance selection signal S1.

Therefore, it is determined that the combination of ON/OFF of the transistors T1 to Tn, Tex1 and Tex2 indicated by data stored in the set value memory 2061 corresponds to a state that optimum tuning for the received radio waves is performed, and the data stored in the set value memory 2061 is stored in a set value data table 2071 (corresponding to step A7).

Figure 7:
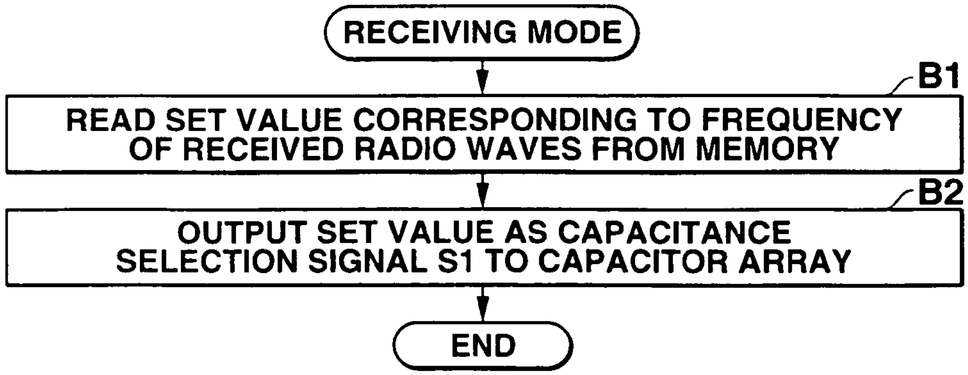
FIG. 7 is a flowchart showing an operation of the control circuit in a receiving mode according to the embodiment of the present invention.

FIG. 7 is a flowchart illustrating a flow of an operation of the control circuit 206 in the receiving mode. When the signal S0 indicative of the receiving mode is input to the control circuit 206 from the CPU 101, an operation in the receiving mode is started.

The control circuit 206 reads a set value corresponding to a frequency of received radio waves from the set value data table 2071 (step B1), and outputs the read set value as a capacitance selection signal S1 to the capacitor array 201 (step B2). Upon receiving the capacitance selection signal S1, the capacitor array 201 decodes it in the decoder 300, and outputs switching data to a gate of each transistor. As a result, a capacitor to be connected to the antenna ANT in parallel is determined, and a tuning capacitance optimum for the received radio waves can be obtained.

As described above, the tuning capacitance of the capacitor array 201 is increased in increments of one level (capacitance is enlarged) in the tuning mode, and a value of the reception level signal S6 at that moment is compared with a value of the previous reception level signal S6. If a value of the previous reception level signal S6 is larger, a set value of the capacitance selection signal S1 indicative of a combination of the previous capacitor connection of the capacitor array 201 is stored in the memory 207.

As a result, a combination of the capacitor connection used to perform optimum tuning with respect to the received radio waves (tuning capacitance) can be readily known. Further, since set values of the plurality of capacitance selection signals S1 can be stored in the memory 207, a radio wave receiver capable of receiving radio waves having a plurality of frequencies can be realized.

Furthermore, in the receiving mode, when a set value corresponding to a frequency of the radio waves to be received is output to the capacitor array 201 as the capacitance selection signal S1, it is possible to readily set a tuning capacitance indicative of optimum tuning with respect to the received radio waves.

According to the radio wave receiver of the embodiment, since a capacitance which should be connected in order to cause a reception state of radio waves having a predetermined frequency to enter a predetermined receiving state is determined and stored, tuning with the radio waves having the predetermined frequency can be automatically effected.

Although the embodiment to which the present invention is applied has been described above, the present invention is not limited to the foregoing embodiment, and various modifications can be of course added without departing from the scope of the invention.

For example, as shown in FIG. 4, the capacitor array 201 is constituted by connecting in parallel the plurality of transistors connected in series with the plurality of capacitors, and a tuning capacitance can be varied by controlling ON/OFF of the transistors by using switching data output from the decoder 300. However, the tuning capacitance may be varied by using a variable capacitance diode.

Figure 9:
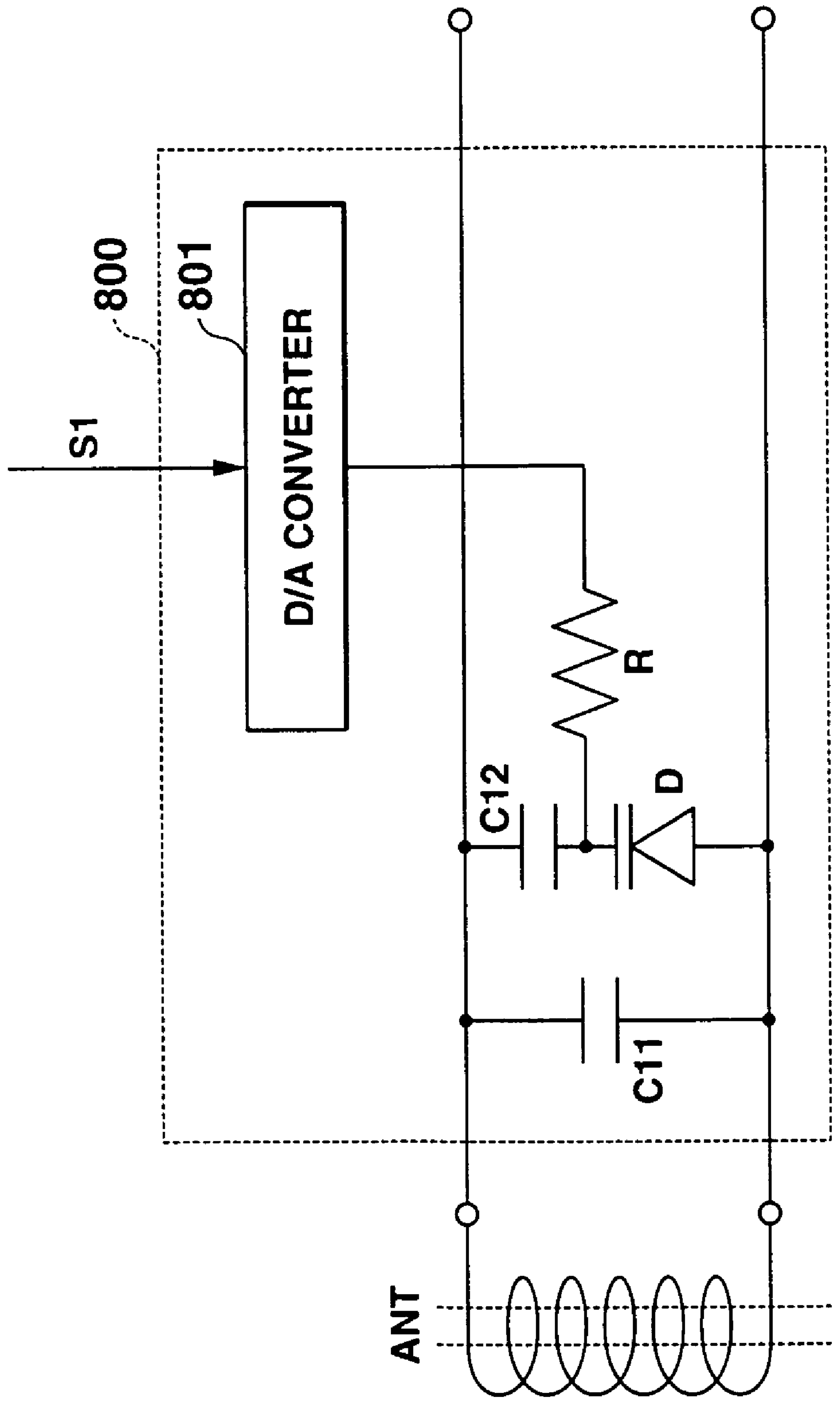
FIG. 9 is a circuit configuration diagram of a capacitor array when using a variable capacitance diode.

FIG. 9 is a circuit configuration diagram of a capacitor array 800 when using a variable capacitance diode D. The capacitor array 800 is constituted of, e.g., a variable capacitance diode D, capacitors C11 and C12, a resistor R, and a D/A converter 801.

A capacitance selection signal S1 output from the control circuit 206 is input to the D/A converter 801. Moreover, D/A conversion is carried out based on a set value of the capacitance selection signal S1, and a signal having a predetermined voltage level is output. A capacitance of the variable capacitance diode D is varied in accordance with a voltage level of a signal output from the D/A converter 801. As a result, a tuning capacitance of the capacitance array 800 is changed, and it is possible to set a tuning frequency used to perform optimum tuning with respect to received radio waves.

Additionally, although the description has been given as to the case in which the tuning mode and the receiving mode are carried out as different modes, these two modes may be performed simultaneously as one mode. For example, the tuning mode is effected before performing the receiving mode, and a set value indicative of optimum tuning relative to received radio waves is obtained. Thereafter, the receiving mode is performed, thereby realizing the radio wave receiver effecting tuning always optimum with respect to received radio waves.

The invention claimed is:

1. A radio wave receiver comprising:

an antenna;

a variable capacitor section connected to the antenna, wherein the variable capacitor section comprises capacitors and switching elements that are connected to the capacitors in series;

a memory which is configured to store at least two items of data for setting a capacitance of the variable capacitor section to at least two suitable values that are suitable for receiving radio waves having at least two frequencies; and a controller which (i) detects suitable combinations of on and off states of the switching elements such that the radio wave receiver is in a predetermined reception state for the at least two frequencies, (ii) writes into the memory data for setting the on and off states of the switching elements to the suitable combinations, (iii) reads the data from the memory in accordance with a received radio wave, and (iv) turns on and off the switching elements based on the read data.

2. The radio wave receiver according to claim 1, wherein the variable capacitor section comprises internal capacitors provided in a capacitor module and external capacitors provided outside the capacitor module.

3. The radio wave receiver according to claim 1, further comprising a reception state detector which detects a reception state, wherein the controller controls the switching elements in such a manner that a capacitance component connected to the antenna gradually varies when receiving the radio wave having one of the at least two frequencies, and writes into the memory data indicating a present combination of on and off states of the switching elements when the reception state detector detects the predetermined reception state.

4. The radio wave receiver according to claim 3, wherein the controller controls the switching elements in such a manner that the capacitance component connected to the antenna is increased, and wherein the controller writes into the memory data indicating the present combination of on and off states of the switching elements immediately before a change of a reception level shifts from an increase to a decrease.

5. The radio wave receiver according to claim 1, wherein the radio waves which have the at least two frequencies comprise a standard time signal including a time code.

6. The radio wave receiver according to claim 1, wherein the radio wave receiver has a receiving mode and a tuning mode, wherein the controller writes into the memory data for setting the capacitance of the variable capacitor section to one of the at least two suitable values such that the radio wave receiver is in the predetermined reception state for receiving the radio wave which has one of the at least two frequencies in the tuning mode, and wherein the controller turns on and off the switching elements based on the data in the memory to set the capacitance of the variable capacitor section to the one of the at least two suitable values in the receiving mode.

7. A radio-controlled timepiece comprising:

a radio wave receiver which receives a radio wave;

a time code generator configured to generate a time code based on the radio wave received by the radio wave receiver;

a clocking unit which counts a current time; and a correction unit which corrects current time counted by the clocking unit based on the time code generated by the time code generator;

wherein the radio wave receiver comprises:

an antenna;

a variable capacitor section connected to the antenna, wherein the variable capacitor section comprises capacitors and switching elements connected to the capacitors in series;

a memory which is configured to store at least two items of data for setting a capacitance of the variable capacitor section to at least two suitable values that are suitable for receiving radio waves having at least two frequencies; and a controller which: (i) detects suitable combinations of on and off states of the switching elements such that the radio wave receiver is in a predetermined reception state for each of the at least two frequencies, (ii) writes into the memory data for setting the on and off states of the switching elements to the suitable combinations, (iii) reads the data from the memory in accordance with the received radio wave, and (iv) turns on and off the switching elements based on the read data.

8. The radio-controlled timepiece according to claim 7, wherein the variable capacitor section comprises internal capacitors provided in a capacitor module and external capacitors provided outside the capacitor module.

9. The radio-controlled timepiece according to claim 7, further comprising a reception state detector which detects a reception state, wherein the controller controls the switching elements in such a manner that a capacitance component connected to the antenna gradually varies when receiving the radio wave having one of the at least two frequencies, and writes into the memory data indicating a present combination of on and off states of the switching elements when the reception state detector detects the predetermined reception state.

10. The radio-controlled timepiece according to claim 9, wherein the controller controls the switching elements in such a manner that the capacitance component connected to the antenna is increased, and wherein the controller writes into the memory data indicating the present combination of on and off states of the switching elements immediately before a change of a reception level shifts from an increase to a decrease.

11. The radio-controlled timepiece according to claim 7, wherein the radio wave receiver has a receiving mode and a tuning mode, and wherein the controller writes into the memory data for setting the capacitance of the variable capacitor section to one of the at least two suitable values such that the radio wave receiver is in the predetermined reception state for receiving the radio wave which has one of the at least two frequencies in the tuning mode, and wherein the controller turns on and off the switching elements based on the data in the memory to set the capacitance of the variable capacitor section to the one of the at least two suitable values in the receiving mode.

* * * * *